G. T. REICHENBACH & H. O. PECK.
VEHICLE WHEEL RIM.
APPLICATION FILED MAY 9, 1911.
1,017,466.
Patented Feb. 13, 1912.
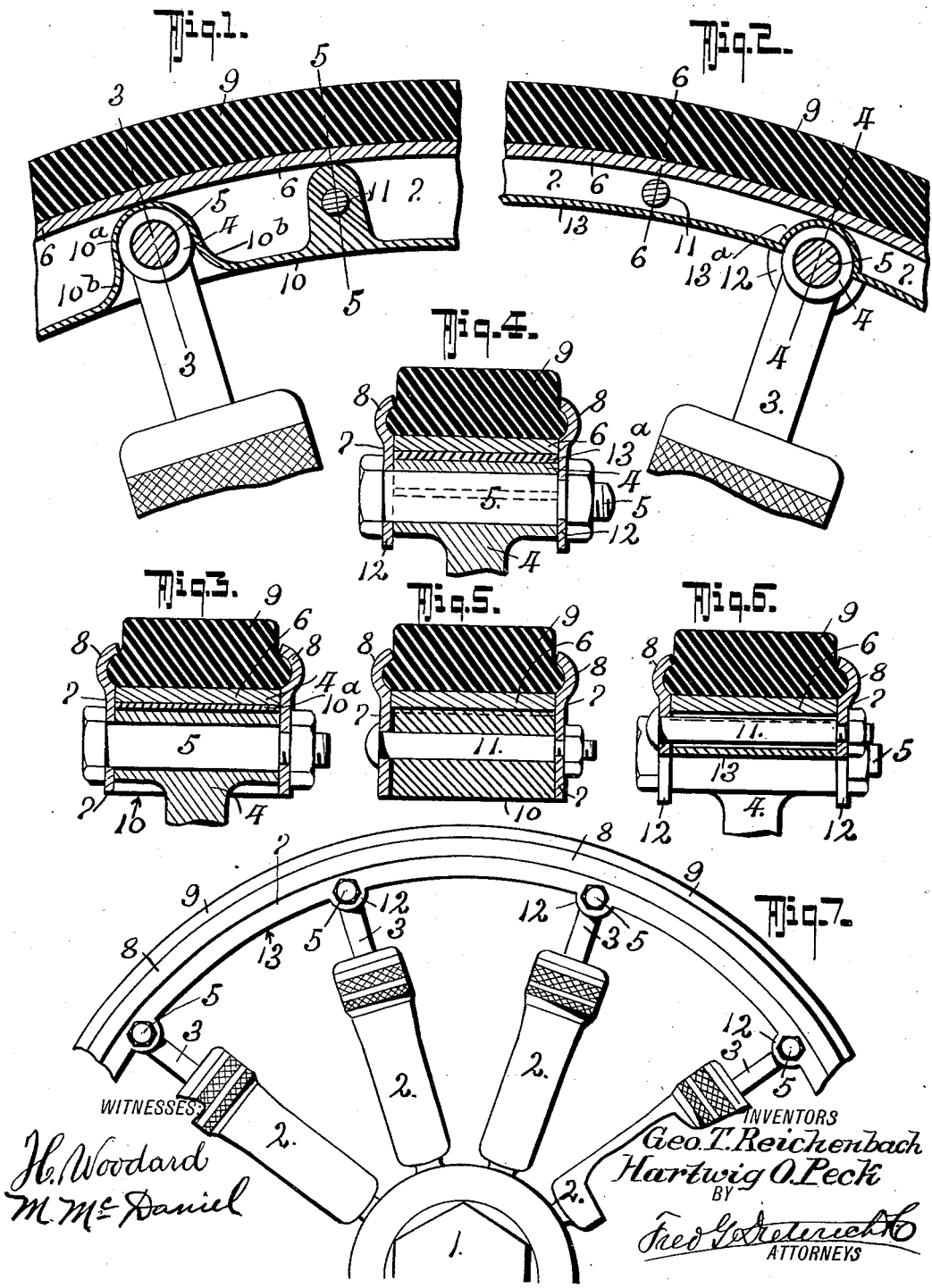

UNITED STATES PATENT OFFICE.

GEORGE T. REICHENBACH AND HARTWIG O. PECK, OF PORTLAND, OREGON, ASSIGNORS TO H. O. PECK AUTOMOBILE WHEEL COMPANY, INCORPORATED, OF PORTLAND, OREGON.

VEHICLE WHEEL-RIM.

1,017,466.  Specification of Letters Patent.  Patented Feb. 13, 1912.

Application filed May 9, 1911. Serial No. 626,018.

*To all whom it may concern:*

Be it known that we, GEORGE T. REICHENBACH and HARTWIG O. PECK, residing in Portland, county of Multnomah, and State of Oregon, have invented a new and Improved Vehicle Wheel-Rim, of which the following is a specification.

Our invention relates to certain new and useful improvements in vehicle wheels of the resilient or spring spoke type and the present invention more particularly relates to the construction of the rim of the wheel.

In carrying out our invention, we provide a rim consisting of a flat metallic rim band held between a pair of annular side plates, the plates being spaced apart and carrying the pivot bolts or pins for the spokes. The spoke heads are pivoted on the pins or bolts between the side plates and the space between adjacent spoke heads is closed by a thin metal band which is bent to form pockets to receive the spoke heads, the side plates having tire receiving channels in which a surface tire may be held.

The invention also includes those novel details of construction, combination and arrangement of parts all of which will be first fully described and then be specifically pointed out in the appended claims, reference being had to the drawings in which, Figure 1, is a central vertical longitudinal section of a part of a vehicle wheel embodying the invention, a part of the spoke being shown in elevation. Fig. 2, is a view similar to Fig. 1 of a slight modification of the invention. Fig. 3, is a cross section on the line 3—3 of Fig. 1. Fig. 4, is a cross section on the line 4—4 of Fig. 2. Fig. 5, is a cross section on the line 5—5 of Fig. 1. Fig. 6, is a cross section on the line 6—6 of Fig. 2. Fig. 7, is a side elevation of a part of the vehicle wheel constructed in accordance with the invention.

Referring now to the accompanying drawings in which like numerals and letters of reference indicate like parts in all of the figures, 1 designates the hub, 2 the hub engaging spoke section, 3 the rim engaging spoke section and 4 the head of the spoke section 3.

7—7 designates a pair of annular side plates of ring like form having their outer edges bent at 8 to form tire receiving channels. The plates 7 are spaced apart by an annular metallic band 6 against which the tire 9 rests, the band 6 forming the periphery of the rim proper of the wheel. Below the plate 6, the side plates 7 carry a set of lugs, pins or bolts (bolts being shown on the drawings) 5 on which the spoke heads 4 are pivoted.

10 designates an annular ring like plate that closes the spaces between the side plates 7 at their inner edges and the plate 10 is bent at $10^a$ to encircle the outer half of the spoke heads 4, the portion $10^a$ merging with the body 10 through diverging sections $10^b$ in the form shown in Fig. 1. In the form shown in Fig. 2, however, the side plates 7 are of less depth than are shown in Fig. 1, and are provided with lugs 12 through which the pivots 5 project and in this form the inner annular plate 13 has the semi-circular pocket portions $13^a$ merging directly with the body 13 of the plate.

Suitable securing members 11 may project through projecting portions of the band 10 to connect the side plates in addition to the pins 5 as indicated in Fig. 1.

In the form shown in Fig. 1, the sections $10^b$ of the plate 10 are diverged sufficiently to allow for the required turning of the spoke heads 4 on the pivots 5.

From the foregoing description taken in connection with the accompanying drawings, the complete arrangement and advantages of our present invention will be readily apparent.

What we claim is:

1. In a vehicle wheel, a rim composed of a pair of side plates having tire receiving channels at their outer peripheries, spoke heads pivoted between said plates and spaced apart, an inner annular band for closing the space between said side plates adjacent to the inner edges thereof, said band having portions bent to form spoke head receiving pockets and means for securing said side plates and said band in position.

2. In a vehicle wheel, a rim composed of a pair of side plates having tire receiving channels at their outer peripheries, spoke heads pivoted between said plates and spaced apart, an inner annular band for closing the space between said side plates adjacent to the inner edge thereof, said band having portions bent to form spoke head receiving pockets and means for securing said side plates and said band in position, and a metallic tire band held between said side plates and located between said spoke head pockets and said tire.

3. In a vehicle wheel, a rim including a pair of side plates, spoke pivots carried by said side plates and projecting between said side plates and spaced apart, an annular metallic rim band mounted between said side plates, outer spoke heads pivoted on said spoke pivots between said side plates, means for holding said side plates in position, and means for closing the space between said side plates and said spoke heads, said last named means comprising an annular band held between said side plates adjacent to their inner edge and having spoke head receiving pocket portions shaped to receive said spoke heads, and projecting between said spoke heads and said outer annular band, said inner band having inward projections through which said side plate holding means project.

GEORGE T. REICHENBACH.
HARTWIG O. PECK.

Witnesses to Reichenbach's signature:
A. E. DIETERICH,
FRED G. DIETERICH.
Witnesses to Peck's signature:
GEO. W. CALDWELL,
J. A. COLEMAN.

Copies of this patent may be obtained for five cents each, by addressing the "Commissioner of Patents, Washington, D. C."